(12) United States Patent
Ayadat et al.

(10) Patent No.: US 12,709,891 B1
(45) Date of Patent: Aug. 18, 2026

(54) SHEAR PANEL FOR USE IN MODULAR CONSTRUCTION OF BUILDINGS

(71) Applicant: PRINCE MOHAMMAD BIN FAHD UNIVERSITY, Dhahran (SA)

(72) Inventors: Tahar Ayadat, Dhahran (SA); Samar Dernayka, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/354,705

(22) Filed: Oct. 9, 2025

(51) Int. Cl.
*E04B 2/86* (2006.01)
*B32B 13/06* (2006.01)

(52) U.S. Cl.
CPC ................ *E04B 2/86* (2013.01); *B32B 13/06* (2013.01); *B32B 2311/30* (2013.01); *B32B 2419/00* (2013.01)

(58) Field of Classification Search
CPC ........ E04B 2/86; E04B 2/8623; E04B 2/8629; E04C 2/06; E04C 2002/045; E04C 2002/046
See application file for complete search history.

(56) References Cited

U.S. PATENT DOCUMENTS 3,683,576 A * 8/1972 Sikes .................... E04B 1/6129 52/250
5,311,712 A * 5/1994 Accousti ................ H02G 3/286 52/270

(Continued)

FOREIGN PATENT DOCUMENTS

CN 102936930 A 2/2013
CN 107060192 A 8/2017

(Continued)

OTHER PUBLICATIONS

English machine translation of CN107237426 (Year: 2025).*

(Continued)

*Primary Examiner* — Christine T Cajilig

(74) *Attorney, Agent, or Firm* — Oblon, McClelland, Maier & Neustadt, L.L.P.

(57) ABSTRACT

A shear panel for use in the modular construction of buildings including: a bottom base disposed horizontally and including a first ferroconcrete; a frame including a first pair of parallel steel walls and second pair of parallel steel walls, wherein the length ($l^f$) and the width ($w^f$) of the steel frame are respectively less than the length ($l^b$) and width ($w^b$) of the solid bottom base and further wherein a fraction of the height ($h^f$) of the first and second pairs of parallel steel walls is embedded within the first ferroconcrete of the bottom base such that each pair of parallel walls extends a vertical distance ($h^e$) from the bottom base to define a total internal volume of the steel frame ($V^f$); and, n steel beams disposed vertically within the internal volume of the steel frame to divide the total internal volume of the frame ($V^f$) into (n+1) vertical chambers.

14 Claims, 8 Drawing Sheets

(56) References Cited

U.S. PATENT DOCUMENTS

| | | | | | |
|---|---|---|---|---|---|
| 5,469,674 | A * | 11/1995 | Morello | E04C 3/40 | |
| | | | | 52/425 | |
| 7,444,789 | B1 * | 11/2008 | Moore | E02D 31/02 | |
| | | | | 52/404.1 | |
| 2019/0161964 | A1 * | 5/2019 | Figueroa | E04B 1/167 | |
| 2021/0148078 | A1 * | 5/2021 | Burton | E02D 27/02 | |

FOREIGN PATENT DOCUMENTS

| | | | | |
|---|---|---|---|---|
| CN | 107237426 A * | 10/2017 | E04B 2/68 | |
| CN | 209670131 U | 11/2019 | | |
| CN | 111119376 A | 5/2020 | | |
| WO | WO-2020034315 A1 * | 2/2020 | E04G 21/00 | |

OTHER PUBLICATIONS

Maryam Bypour, et al., “Predicting the shear capacity of composite steel plate shear wall with the application of RSM”, Engineering Structures, vol. 301, Feb. 15, 2024, 117263, 17 Pages.

* cited by examiner

SHEAR PANEL FOR USE IN MODULAR CONSTRUCTION OF BUILDINGS

BACKGROUND

Technical Field

The present disclosure is directed to a shear panel for use in the modular construction of buildings. More particularly, the present disclosure is directed to a shear panel which comprises a base and a frame supported by that base, wherein the frame is partitioned into a plurality of vertical chambers which are filled with ferroconcrete.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Rapid urbanization has led to significant growth in the building and construction industry. Due to constraints upon land use, there has been an increased demand for high-rise buildings. Problematically, high-rise buildings may need to be constructed in regions that are prone to strong winds and seismic activities. Buildings constructed in such regions may become susceptible to damage from these environmental and geological forces. To obviate such damage, buildings constructed in regions experiencing earthquakes of various magnitudes, ranging from minor earthquakes to major earthquakes, require specialized structural reinforcement systems to maintain their integrity during seismic events.

As an exemplary structural modification, shear walls are formed and integrated during the foundation of buildings. Shear walls are a vertical structural component that are conventionally designed to resist lateral forces that may be generated by strong winds, earthquakes and other environmental factors: the shear walls transfer loads through the building structure to the foundation, thereby providing resistance against both in-plane and out-of-plane forces. The shear walls are generally constructed using steel, reinforced bars, or composite material.

It is considered that existing shear walls suffer from certain limitations, including low tensile strength, poor earthquake resistance, and limited extensibility under earthquake loading conditions. Additionally, conventional shear walls often require long on-site construction times, extensive scaffolding systems, and complex welding operations that increase construction costs and schedules. Moreover, the performance of conventional shear walls under different earthquake magnitudes varies significantly, with many systems failing to provide adequate protection across the entire magnitude range of seismic activities experienced in a given building's locus.

CN107237426A (Panfeng) describes a reinforced concrete column wall structure comprising a wall body, wherein the wall body is a monolithic wall of rectangular cross-section formed by a wall steel frame enclosed by steel plates. The structure includes connectors arranged along the height direction of the wall steel frame and an interior partitioned into a dark column space which is integrally cast with wall concrete. However, this reference does not describe a shear panel which is provided with vertical chambers which are divided by steel beams and which are independently filled with a ferroconcrete to provide a modular construction system with specific dimensional relationships between a frame and a wider, deeper base.

CN209670131U (Taikong Intelligent Construction Co. Ltd.) describes an assembled shear wall structure having first and second pairs of parallel steel walls which define a frame with a rectangular cross-section. The internal volume of the frame is divided into vertical chambers by vertical profiled steel beams, and concrete may be independently poured into each of the vertical chambers. However, this reference does not describe a shear panel wherein the vertical chambers are divided by steel beams and independently filled with a ferroconcrete to provide a modular construction system with specific dimensional relationships between a frame and a wider, deeper base.

CN111119376A (Beijing Fengzhu Engineering Tech. Research Institute Co. Ltd.) describes a reinforced multi-cavity steel tube concrete shear wall comprising a frame having a rectangular cross-section constituted by first and second parallel walls. The internal volume is divided into vertical cavity units by a vertical partition, with the cavity units being filled with steel-frame reinforced concrete. However, this reference does not describe a shear panel wherein the vertical chambers are divided by steel beams and independently filled with a ferroconcrete to provide a modular construction system with specific dimensional relationships between a frame and a wider, deeper base.

CN107060192A (Zhejiang Lyuzhu Integration Tech. Co. Ltd.) describes a steel tube concrete shear wall comprising a frame with a rectangular cross-section constituted by first and second parallel walls defining an internal volume. The internal volume is not divided into discrete vertical cavity units but comprises a series of linearly spaced H-steel plates independently welded to the walls of the frame. This reference does not describe a shear panel wherein the vertical chambers are divided by steel beams and independently filled with a ferroconcrete to provide a modular construction system with specific dimensional relationships between a frame and a wider, deeper base.

CN102936930A (University Beijing Technology) describes a shear wall structure comprising a bottom base and a frame with a rectangular cross section. Disposed within the frame are discrete steel columns, between which are disposed tie bars and a steel lattice. However, this reference does not describe a shear panel wherein the vertical chambers are divided by steel beams and independently filled with a ferroconcrete to provide a modular construction system with specific dimensional relationships between a frame and a wider, deeper base.

Bypour et al., *Engineering Structures,* 301:117263 (2024) describes shear plate wall structures that provide lateral force resisting systems. The reference details structures wherein stiffeners, rebars, plates, and tie bars provide increased shear resistance to steel panels. However, this reference does not describe a shear panel wherein the vertical chambers are divided by steel beams and independently filled with a ferroconcrete to provide a modular construction system with specific dimensional relationships between a frame and a wider, deeper base.

Each of the aforementioned references suffers from one or more drawbacks hindering their adoption. The existing shear wall structures present significant challenges to their widespread adoption in modern construction, such as low tensile strength, poorer earthquake resistance, and limited extensibility under the action of an earthquake. Such improvements are necessary to protect large and high-rise buildings from damage caused by strong winds and seismic activities.

Therefore, there remains a critical need to develop shear walls that can overcome the limitations of low tensile strength, poorer earthquake resistance, and limited extensibility. The present disclosure aims to address the challenges by providing a shear panel designed for modular construction, offering a solution to meet the challenges of the building and construction industry.

SUMMARY

In an exemplary embodiment, a shear panel for use in the modular construction of buildings is described. The shear panel comprises: a bottom base disposed horizontally and comprising a first ferroconcrete, the bottom base having a rectangular cross-section and having a height ($h^b$), length ($l^b$) and width ($w^b$); and, a frame having a rectangular cross-section and comprising: a first pair of parallel steel walls which have an length which defines the length ($l^f$) of the steel frame, the length ($l^f$) of the steel frame being less than the length ($l^b$) of the solid bottom base; and, a second pair of parallel steel walls which are orthogonal to the first pair of parallel walls and which have an length which defines the width ($w^f$) of the steel frame, the width ($d^f$) of the steel frame being less than the width ($w^b$) of the bottom base, wherein: a fraction of the height ($h^f$) of the first and second pairs of parallel steel walls is embedded within the first ferroconcrete of the bottom base such that the first and second pairs of parallel steel walls each extend a vertical distance ($h^e$) from the bottom base; and the first and second parallel walls are connected to each other and together with the bottom base define the total internal volume of the steel frame ($V^f$). The shear panel further comprises n steel beams which are disposed vertically within the internal volume of the steel frame and at intervals across the length ($l^f$) thereof, which steel beams each contact the bottom base and extend therefrom so as to divide the total internal volume of the frame ($V^f$) into (n+1) vertical chambers each having an height ($h^e$), wherein: n is an integer of at least 2; and, each of the (n+1) vertical chambers is filled with a second ferroconcrete.

In some embodiments, the n steel beams each further contact the first pair of parallel walls so as to divide the total internal volume of the frame ($V^f$) into (n+1) discrete vertical chambers each having an height ($h^e$) and wherein each of the (n+1) discrete vertical chambers is independently filled with the second ferroconcrete.

In some embodiments, n is an integer of from 2 to 6.

In some embodiments, n is an integer of from 3 to 5.

In some embodiments, the n steel beams have a rectangular cross-section.

In some embodiments, the n steel beams are H-beams.

In some embodiments, the n steel beams are H-beams of which each flange contacts one wall of the first pair of parallel steel walls.

In some embodiments, at least one of the n steel beams is devoid of through-holes.

In some embodiments, a fraction of each of the n steel beams is embedded within the first ferroconcrete of the bottom base.

In some embodiments, the first ferroconcrete comprises a first concrete and at least one first steel reinforcing bar disposed therein, the at least one first steel reinforcing bar having: an ultimate tensile strength of at least about 400 MPa, as determined by ASTM A36; a yield strength of at least about 250 MPa, as determined by ASTM A36; and, an elongation at break of at least about 5%, as determined by ASTM A36.

In some embodiments, the first concrete has a compressive strength of at least about 30 MPa, as determined by ASTM C39.

In some embodiments, the shear panel comprises a plurality of first steel reinforcing bars disposed horizontally within the bottom base.

In some embodiments, the first ferroconcrete further comprises at least one steel girder which has a rectangular cross-section and is disposed horizontally within the bottom base.

In some embodiments, a fraction of each of the n steel beams is embedded within the first ferroconcrete of the bottom base; and, the embedded fraction of each of the n steel beams is connected to the at least one steel girder.

In some embodiments, the embedded fraction of each of the n steel beams is welded to the at least one steel girder.

In some embodiments, the steel of the first and second pairs of parallel walls has: an ultimate tensile strength of at least 400 MPa, as determined by ASTM A36; a yield strength of at least 250 MPa, as determined by ASTM A36; and, an elongation at break of at least 20%, as determined by ASTM A36.

In some embodiments, the steel of the first and second pairs of parallel walls has: an ultimate tensile strength of from about 400 to about 800 MPa, as determined by ASTM A36; a yield strength of from about 250 to about 750 MPa, as determined by ASTM A36; and an elongation at break of at least about 5%, as determined by ASTM A36.

In some embodiments, the second ferroconcrete comprises a second concrete and at least one second steel reinforcing bar having: an ultimate tensile strength of at least about 400 MPa, as determined by ASTM A36; a yield strength of at least about 250 MPa, as determined by ASTM A36; and, an elongation at break of at least about 5%, as determined by ASTM A36.

In some embodiments, the second concrete has a compressive strength of 30 MPa, as determined by ASTM C39.

In some embodiments, the shear panel comprises a plurality of second steel reinforcing bars disposed vertically within the second concrete.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
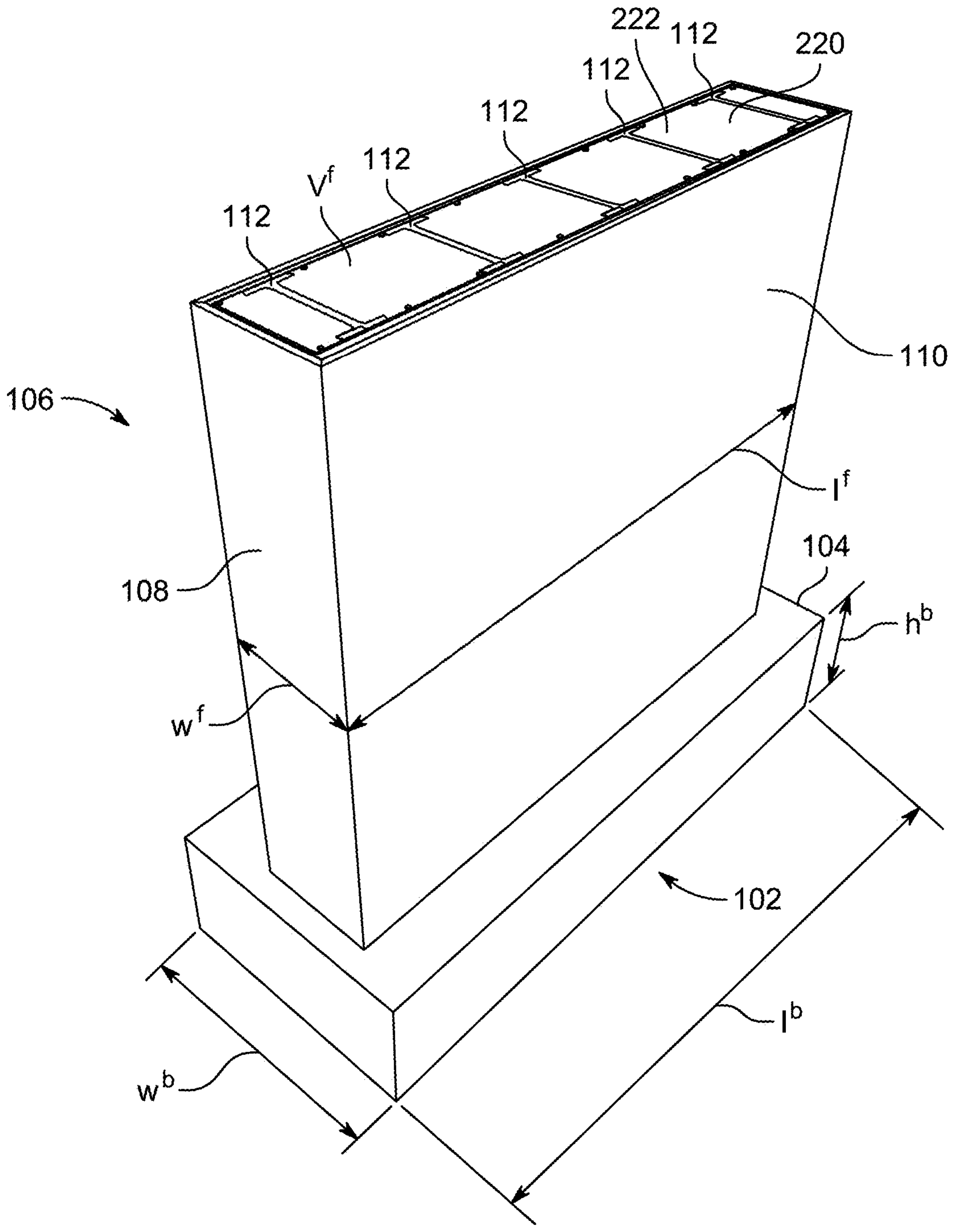
FIG. 1A is an isometric view of a shear panel, according to certain embodiments.

In the drawings, like reference numerals designate identical or corresponding parts throughout the several views.

As used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

As used throughout this application, the word "may" is used in a permissive sense—that is meaning to have the potential to—rather than in the mandatory sense.

Spatially relative terms, such as "horizontal", "vertical", "interior", "exterior", "top", "bottom", "back", "above", "below", "left", "right" and the like may be applicable herein to describe a component's relationship to another component(s) as illustrated in the figures. Obviously all such spatially relative terms refer to the orientation shown in the figures only for ease of illustration and are not necessarily limiting given that an assembly can assume orientations and configurations different from those illustrated in the figures when in use.

The term "disposed on" as used herein encompasses "mounted on", "placed on", "positioned on", "supported by", "attached to" and "connected to", either directly or indirectly.

The term "binder" is to be understood as any component having the property of introducing cohesion to the composition in which it is incorporated and which makes it possible to provide mechanical characteristics to the said formulation, such as but not limited to compressive strength, tensile strength and adherence.

The term "hydraulic binder" is to be understood as any binder ingredient which has the property of becoming hydrated in the presence of water, the hydration of which ingredient makes it possible to obtain a solid having mechanical characteristics. The term "hydraulic binder" also denotes hydric binders.

As used herein, "concrete" means any type of building material containing aggregates such as stone, gravel, brushed rock or sand which are embedded in a hydraulic binder matrix that fills the space between the aggregate particles and binds them together. The "concrete" may further include organic or silica-based fibers or metallic wires, cables or rods as reinforcing materials.

The term "ferroconcrete" as used herein references a concrete in which a metallic material containing iron is embedded so that the two materials act together in resisting forces. The term "ferroconcrete" does not preclude the presence of further reinforcing materials of which mention may be made of organic or silica-based fibers and non-ferrous metallic wires, cables or rods.

The term "cement" is understood to mean a cement according to EN 197-1 (2001) and, in particular, a CEM I, CEM II, CEM III, CEM IV or CEM V type cement according to Cement NF EN 197-1 (2012), the disclosure of which is incorporated herein by reference in its entirety. The use of more than one different cement in or as the inorganic hydraulic binder is not precluded.

As used herein, the term "calcium aluminate cement" refers to cements in accordance with Standard EN 14647 *Calcium Aluminate Cement: Composition, specifications and conformity criteria*, the disclosure of which is incorporated herein by reference in its entirety. Such cements may be produced by smelting or sintering as is known in the art and within this Standard can be categorized into the groups: rich in iron; and, low in iron. So-called iron-free calcium aluminate cements are not included in the definition of EN 14647.

The term "mineral additions" refers to: slags, as defined in Cement Standard EN 197-1 (2012) section 5.2.2; steel-making slags; pozzolanic materials, as defined in Cement Standard EN 197-1 (2012) section 5.2.3; fly ash, as defined in Cement Standard EN 197-1 (2012) section 5.2.4; calcined schists, as defined in Cement Standard EN 197-1 (2012) section 5.2.5; limescale, as defined in Cement Standard EN 197-1 (2012) section 5.2.6; fumed silica, as defined in Cement Standard EN 197-1 (2012) section 5.2.7; or, their mixtures. Further mineral additions, not currently recognized by the Cement Standard EN 197-1 (2012), may also have utility in or as the inorganic hydraulic binder. These include, in particular: metakaolins, such as type A metakaolins conforming to standard Norme Francaise (NF) P 18-513 (August 2012); and, siliceous additions, such as the siliceous additions conforming to standard Norme Francaise (NF) P 18-509 (September 2012). The disclosures of Cement Standard EN 197-1 (2012), Norme Francaise (NF) P 18-513 (August 2012) and Norme Francaise (NF) P 18-509 (September 2012) are incorporated herein by reference in their entirety.

The term "adjuvant" as used herein with respect to concrete denotes a substance within the meaning of standard BS EN 206:2013 Concrete-specification, performance, production and conformity (+A2:2021), the disclosure of which is incorporated herein by reference: a product added to the composition in small amounts relative to the mass of composition in order to modify the properties of the fresh or cured composition.

As used herein, "curing" refers to the reactions through which a given composition hardens from a fluid mixture into a solid. Broadly, curing may be performed herein by exposure to ambient conditions or by deliberate exposure to moisture, heat or radiation.

As used herein, the term "water" is intended to encompass tap water, spring water, purified water, de-ionized water, de-mineralized and distilled water. In the formation of concrete or other cementitious compositions as described herein, water should be utilized in its liquid form. The presence of solid water particles—ice—is not desirable as solid water cannot be mobilized for the formation of the hydrates required for the development of strength in cured concrete or cementitious composition.

The aforementioned concrete may be characterized herein by "wt. % based on the total weight of all the non-volatile constituents in the composition". For completeness, a volatile constituent is a constituent which has an initial boiling point of less than or equal to 250° C. as measured at a standard atmospheric pressure of 101.3 kPa. A non-volatile constituent is therefore a constituent which has an initial boiling point of more than 250° C. as measured at a standard atmospheric pressure of 101.3 kPa.

As used herein, the term "metallic" encompasses elemental metal, metal alloys and metal composites. As exemplary metallic materials containing iron, mention may be made of:

iron; iron alloys; and, steels. Representative steels include: crucible steel; carbon steel; spring steel; alloy steel; maraging steel; and, stainless steel, inclusive of austenitic stainless steel, ferritic stainless steel, duplex stainless steel, and Martensitic stainless steel.

The present compositions may defined herein as being "substantially free" of certain compounds, elements, ions or other like components. The term "substantially free" is intended to mean that the compound, element, ion or other like component is not deliberately added to the composition and is present, at most, in only trace amounts which will have no (adverse) affect on the desired properties of the coating. An exemplary trace amount is less than 1000 ppm by weight of the composition. The term "substantially free" encompasses those embodiments where the specified compound, element, ion, or other like component is completely absent from the composition or is not present in any amount measurable by techniques generally used in the art.

The "water adsorption capacity" of concrete as mentioned herein references the amount of water adsorbed by the cured concrete as a percentage by weight of the initially provided cured concrete sample. The "water adsorption capacity" and is determined herein in accordance with ASTM C642-21 *Standard Test Method for Density, Absorption, and Voids in Hardened Concrete*, the disclosure of which is incorporated herein in its entirety.

As used herein, the term "fineness modulus" refers to an empirical factor that gives a relative measure of the proportions of fine and coarse particles in an aggregate. Fineness modulus is a value used to indicate the relative fineness or coarseness of a fine aggregate and is determined herein according to ASTM C 117-17 *Standard Test Method for Materials Finer than* 75-μ*m* (*No.* 200) Sieve in Mineral Aggregates by Washing, the disclosure of which is incorporated herein in its entirety.

The aggregate crushing value is used herein to indicate an aggregate's resistance to crushing under a gradually applied load and is determined in accordance with ISO 20290-3: 2019 *Aggregates for concrete—Test methods for mechanical and physical properties: Part* 3*: Determination of aggregate crushing value* (*ACV*), the disclosure of which is incorporated herein by reference in its entirety.

Where the aspects of the disclosure are described above as having certain embodiments, any one or more of those embodiments can be implemented in or combined with any one of the further embodiments, even if that combination is not explicitly described. Expressed differently, the described embodiments are not mutually exclusive, and permutations thereof remain within the scope of this disclosure.

Aspects of this disclosure are directed towards a shear panel specifically designed for use in the modular construction of large and high-rise buildings. The shear panel comprises multiple interconnected components arranged to provide superior mechanical properties and structural performance. The interconnected components are designed to distribute an applied load throughout the structure, thereby increasing structural integrity and durability of the building framework. The shear panel provides significantly improved tensile strength, load-bearing capacity and resistance to lateral forces. The shear panel is specifically configured to provide modular construction capabilities that may eliminate the need for scaffolding and may reduce construction time, while providing adequate lateral stiffness and ductility needed for primary seismic force-resisting systems. The shear panel can be pre-fabricated off-site and transported to construction sites for rapid assembly, thereby reducing on-site construction time and labor costs.

Figure 1B:
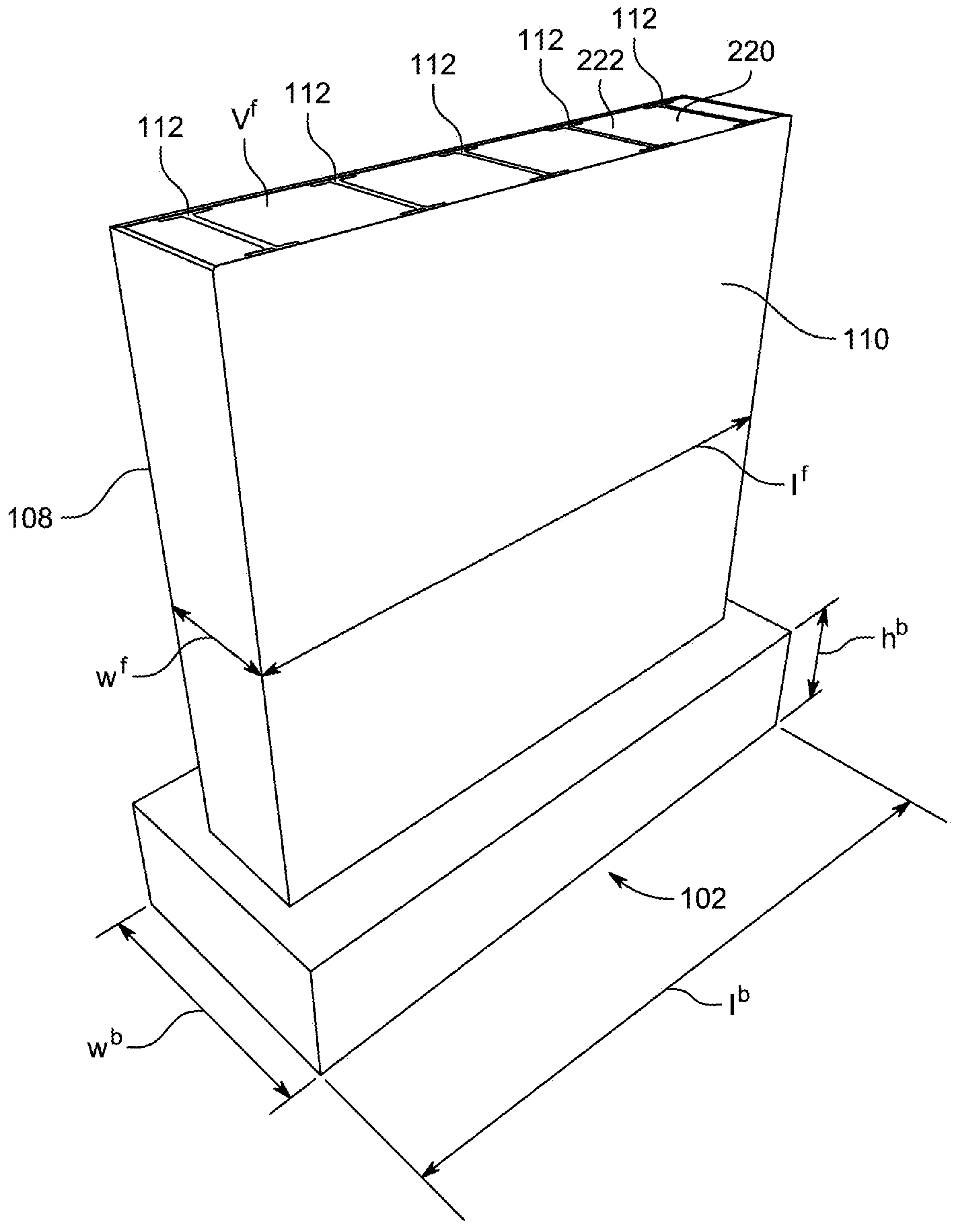
FIG. 1B is a further isometric view of the shear panel showing a frame therein, according to certain embodiments.

Referring to FIG. 1A and FIG. 1B in combination, illustrated are different isometric views of a shear panel 100, according to embodiments of the present disclosure. The shear panel 100 is designed to accommodate different seismic loading conditions, with structural configurations optimized for regions experiencing minor to strong earthquakes of magnitude 3.0 to 6.9, as well as regions experiencing major to great earthquakes of magnitude 7.0 or greater. The modular design of the shear panel 100 enables standardized manufacturing processes and quality control procedures that ensure consistent structural performance across multiple units. The shear panel 100 is designed for applications in various construction projects, commercial buildings, and civil engineering projects such as bridges and industrial facilities. The shear panel 100 is particularly suited for construction in seismic zones where earthquake resistance is required, with the structural configuration providing enhanced energy dissipation capacity during seismic events.

The shear panel 100 is a vertical structural element that supports the weight of the structures above the panel and is configured to transfer an applied load along wide, vertically oriented beams to the foundation base. The shear panel 100 is specifically designed for use in large and high-rise buildings to resist lateral forces and to provide increased rigidity, stability and structural integrity to the overall building structure. The shear panel 100 is configured to distribute shear forces efficiently throughout the structural framework while simultaneously resisting both in-plane and out-of-plane forces that may act on the building structure.

As illustrated, the shear panel 100 comprises a bottom base 102 disposed horizontally. The bottom base 102 is the foundational structure element of the shear panel 100, that functions as the primary load bearing component in the building foundation. The bottom base 102 is configured to collect and transfer vertical and lateral loads from the upper portion of the shear panel 100 to the underlying foundation structure and to maintain the structural integrity of the building structure. The bottom base 102 provides a stable platform for the vertical structural elements of the shear panel 100 and ensures uniform load distribution to the foundation system. The bottom base 102 is configured with sufficient structural capacity to resist overturning moments and sliding forces that may be induced during lateral loading events such as earthquakes or strong winds.

The bottom base 102 is integrally connected to the foundation of the building through mechanical anchoring systems or cast-in-place connection. The connection between the bottom base 102 and the building foundation may include, without limitation, embedded anchor bolts, dowel bars, or other mechanical fastening systems that ensure load transfer continuity between the shear panel 100 and the foundation structure.

The bottom base 102 comprises or consists of a first ferroconcrete 104. In other words, the bottom base 102 is constructed from a first ferroconcrete 104. The first ferroconcrete 104 is a composite material used in the construction of the bottom base 102. The composite material is configured to provide structural strength and durability to the structure. In one or more embodiments, the first ferroconcrete 104 comprises a first concrete (generally shown in FIG. 2 and represented by reference numeral 214) and at least one first steel reinforcing bar 216 (shown in FIG. 2) integrally combined to form a unified composite structure. Particularly, the first ferroconcrete 104 comprises a plurality of first steel reinforcing bars 216 disposed horizontally within the bottom base 102, as shown in FIG. 2 and FIGS. 3A-3C. The horizontal disposition of the plurality of first steel reinforcing bars 216 provides resistance to bending moments and distributes loads across the bottom base 102. The at least one first steel reinforcing bars 216 are specifically positioned and coupled through mechanical bonding, thermal bonding or structural adhesives to provide for efficient load transfer. The first ferroconcrete 104 is designed to resist both compressive and tensile stresses, with the first concrete 214 providing compressive strength and the at least one first steel reinforcing bar 216 providing tensile strength and crack control. The composite action between the first concrete 214 and the at least one first steel reinforcing bar 216 ensures monolithic behavior of the bottom base 102 under applied loads.

In an exemplary embodiment, the first concrete 214 comprises hydraulic binder, aggregate and optionally adjuvants in a predefined ratio to achieve performance characteristics. The first concrete 214 provides the primary load-bearing medium while the at least one first steel reinforcement bar 216 mitigates tensile stress and prevents crack propagation under various loading conditions. The composition of the first concrete 214 is optimized to achieve the required strength while maintaining adequate workability for placement and consolidation around the steel reinforcing bars and other embedded elements.

It is preferred that the first concrete 214 comprises, based on the total weight of non-volatile constituents in the composition, from about 20 to about 60 wt. %, preferably from about 35 to about 60 wt. % of said hydraulic binder. Exemplary hydraulic binders, which may be used alone or in combination include, but are not limited to: cement(s); mineral additions; anhydrous calcium sulphate; and, semi-hydrated calcium sulphate. It is preferable herein that the hydraulic binder of the first concrete 214 comprises at least one cement. More preferably, the hydraulic binder comprises at least one cement selected from the group consisting of: Portland cement; natural cement; air-entraining Portland cement; Portland-pozzolan cement; slag cement; calcium aluminate cement; blast-furnace cement; and, mixtures thereof. In an embodiment, the hydraulic binder comprises at least one cement selected from the group consisting of: Portland cement; air-entraining Portland cement; Portland-pozzolan cement; and, mixtures thereof.

In certain embodiments, the first concrete 214 may contain gravel aggregates which should desirably be selected to provide adequate strength and durability while maintaining compatibility with the hydraulic binder. The first concrete 214 may desirably comprise, based on the total weight of non-volatile constituents in the composition from about 0 to about 40 wt. % of said gravel aggregates. For example, the first concrete 214 may comprise from about 10 about 35 wt. %, from about 15 to about 35 wt. % or from about 20 to about 35 wt. % of said gravel aggregates, based on the total weight of non-volatile constituents in the composition.

The maximum gravel aggregate size may be limited to ensure proper placement and consolidation of the first concrete 214 around the reinforcing bars disposed therein and within the confinement of the bottom base 102. It is preferred that the gravel aggregates present in the first concrete have at least one of: a specific gravity of from about 2 to about 3; a water absorption capacity of from about 1 to about 5 wt. %, such as from about 1 to about 3 wt. %, or from about 1 to about 2 wt. %; an aggregate crushing value of from about 20 to about 40%, such as from about 25 to about 35%; and, a fineness modulus of from about 2 to about 7, such as from about 2 to about 6, from about 3 to about 6 or from about 3 to about 5. These properties of the gravel aggregates are not mutually exclusive and any one or more thereof may be met by the aggregates employed.

The first concrete 214 may comprise, based on the total weight of non-volatile constituents in the composition from about 0 to about 40 wt. % of sand. For example, the first concrete 214 may comprise from about 10 about 35 wt. %, from about 15 to about 35 wt. % or from about 20 to about 35 wt. % of sand, based on the total weight of non-volatile constituents in the composition. It is preferred that any sand included in the composition has a fineness modulus of from about 2 to about 4.0 such as from about 2 to about 3.5. Further, sand used in the first concrete 214 should desirably be substantially free from clay, silt, and organic matter that may compromise the strength and durability of the concrete.

In certain embodiments, the first concrete 214 comprises at least one adjuvant. Such adjuvants can be used in such combination and proportions as desired, provided they do not adversely affect the nature and essential properties of the composition. While exceptions may exist in some cases, the first concrete 214 should not comprise in toto more than 20 wt. %, based on the total weight of non-volatile constituents in the composition, of adjuvants and preferably should not comprise more than 10 wt. % of said adjuvants.

The first concrete 214 may, in certain embodiments, comprise at least one adjuvant chosen from: colloidal silica; non-colloidal silica; colloidal dispersions of alumina and/or titania; plasticizers; superplasticizers; setting retarders, such as gluconates, carboxylic acids (such as citric acid or tartaric acid), boric acid, sodium tetraborate decahydrate (Borax) and alkali metal phosphates; catalysts; setting accelerators, such as nitrate, thiocyanate and chloride salts; curing accelerators, such as alkali metal carbonates; air entrainers, such as sodium lauryl sulfates; anti-shrinkage agents; anti-bubbling or antifoam agents; leak-proofing agents such as calcium stearate; natural pozzolanic compounds, such as pumice, trass, santorin earth, kieselguhr, homstone and chert; synthetic pozzolanic compounds, such as fired, ground clay (ground brick), fly ashes, silica dust, oil shale ash and metakaolin; anti-sedimentation agents, such as bentonites and attapulgites; mineral or organic pigments; a latex or latices; rheology modifiers; and, water retainers, such as starch ethers, cellulose ethers and modified cellulose ethers.

The first concrete 214 may comprise non-colloidal silica particles, preferably non-colloidal silica particles having a particle size of less than about 1 μm, for example from about 0.05 to 0.5 microns. When present, such sub-micron silica particles may preferably constitute from 1 to 15 wt. %, for example from 1 to 10 wt. % of the total weight of non-volatile constituents in the composition. Where sub-micron, non-colloidal silica is so-incorporated, the silica may be amorphous, crystalline or fumed. It is however preferred that said sub-micron silica should comprise or consist of fumed silica and more preferably fumed silica having a surface area of from about 30 to about 400 $m^2/g$, as determined by the Brunauer, Emmet and Teller (BET) method.

As is known in the art, a "superplasticizer" denotes a de-flocculant organic compound, which acts by electrostatic repulsion and/or by steric bulk. Exemplary superplasticizers having utility in the present disclosure include but are not limited to: polycarboxylates; melamine sulfonates; and, polynaphthalene sulfonates.

The inclusion of organic homo-polymers and co-polymers in the first concrete 214 is not precluded: a latex or latices of such polymers can moderate the adhesive and physical properties of the concrete. Non-limiting examples of suitable (co-)polymers include: vinyl acetate homopolymers; copolymers of vinyl acetate with at least one further vinyl ester; copolymers of vinyl acetate with ethylene;

copolymers of vinyl acetate, ethylene and at least one further vinyl ester; copolymers of vinyl acetate, ethylene and at least one (meth)acrylic ester; copolymers of vinyl acetate with (meth)acrylates and other vinyl esters; copolymers of vinyl acetate, ethylene and vinyl chloride; copolymers of vinyl acetate, ethylene and styrene; copolymers of vinyl acetate with acrylates; styrene-acrylic ester copolymers; styrene-1, 3-butadiene copolymers; and, vinyl chloride-ethylene copolymers.

Preference is given to: vinyl acetate homopolymers; copolymers of vinyl acetate with ethylene; copolymers of vinyl acetate, ethylene and styrene; copolymers of vinyl acetate, ethylene and at least one co-monomer selected from the group consisting of vinyl esters having from 1 to 15 carbon atoms in the carboxylic acid radical, such as vinyl propionate, vinyl laurate and vinyl versatate; copolymers of vinyl acetate, ethylene and at least one co-monomer selected from (meth) acrylic esters of unbranched or branched alcohols having from 1 to 15 carbon atoms, such as N-butyl acrylate and 2-ethylhexyl acrylate; copolymers of vinyl acetate, vinyl esters having from 1 to 15 carbon atoms in the carboxylic acid radical and (meth)acrylic esters of unbranched or branched alcohols having from 1 to 15 carbon atoms; and, copolymers of vinyl acetate, ethylene and vinyl chloride.

Such polymers may be prepared by conventional means accessible to the skilled artisan, such as by emulsion polymerization. In the alternative, such polymers may be provided from commercial sources. By way of example, reference may be made to: FX7000 styrene acrylate copolymer, available from Elotex; HD 1500 vinyl acetate/vinyl versatate copolymer, available from Elotex; and, and FX2322 vinyl acetate/ethylene copolymer available from Elotex.

The term "rheology modifier" denotes an organic compound having utility in increasing one or more of the viscosity, the cohesion and the shear threshold of the composition. Rheology modifiers may further have an anti-bleeding effect. As exemplary rheology modifiers having utility in the first concrete 214 of the present disclosure, mention may be made of modified or unmodified polysaccharides such as diutan gums, xanthan gums, gellan gums and welan gums.

In exemplary embodiments, the first concrete 214 has a compressive strength of at least about 30 MPa, as determined by ASTM C39. As used herein, ASTM C39 is a standard used to measure the compressive strength of cylindrical concrete specimens such as molded cylinders or drilled cores. The compressive strength of 30 MPa provides adequate strength for structural applications while maintaining workability during construction. The first ferroconcrete 104 is designed to achieve the specified compressive strength within 28 days of curing under standard curing conditions. In certain embodiments, the first concrete 214 has a compressive strength of from about 30 to about 90 MPa, for example from about 30 to about 80 MPa, from about 30 to about 70 MPa or from about 30 to about 60 MPa.

Further, herein, the at least one first steel reinforcing bar 216 is a rod used in concrete construction to create the first ferroconcrete 104. In some examples, the at least one first steel reinforcing bar 216 is a hot-rolled deformed bar, a cold-worked steel bar, or a mild steel plain bar.

The or each first steel reinforcing bar 216 should typically have a substantially circular cross-section. In certain embodiments, the or each first steek reinforcing bar 216 should have a substantially circular cross-section characterized by a diameter of from about 5 to about 60 mm, such as from about 5 to about 55 mm, from about 5 to about 50 mm or from about 5 to about 45 mm. An exemplary first steel reinforcing bar 216 of circular cross-section may have a diameter of from about 10 to about 40 mm or from about 12 to about 36 mm.

Each first steel reinforcing bar 216 may independently have a smooth surface or a deformed surface. A preference may be noted for the use of at least one first steel reinforcing bar 216 having a deformed surface comprising at least one of ribs, lugs or indentations. In certain configurations, the at least one first steel reinforcing bar 216 has a ribbed surface which serves to moderate the surface area of contact between the bar 216 and the concrete 214 to thereby improve a mechanical bond with the first concrete 214. The ribbed surface of the at least one first steel reinforcing bar 216 provides a mechanical interlock with the first concrete 214, which prevents slippage of the at least one first steel reinforcing bar 216 within the first concrete 214 and improves the structural strength of the first ferroconcrete 104.

In certain embodiments, the at least one first steel reinforcing bar 216 has: an ultimate tensile strength of at least about 400 MPa, as determined by ASTM A36; a yield strength of at least about 250 MPa, as determined by ASTM A36; and, an elongation at break of at least about 5%, as determined by ASTM A36. As used herein, ASTM A36 is a standard for carbon structural steel. In exemplary embodiments, the at least one first steel reinforcing bar 216 has: an ultimate tensile strength of from about 400 to about 700 MPa, from about 400 to about 650 MPa or from about 400 to about 625 MPa; a yield strength of from about 250 to about 500 MPa, for example of from about 275 to about 500 MPa or from about 300 to about 500 MPa; and, an elongation at break of at least about 10%, for example at least about 15% or at least about 20%.

In some embodiments, as shown in FIG. 2 and FIG. 3A-3C, the first ferroconcrete 104 further comprises at least one steel girder 218. The first ferroconcrete 104 may, in exemplary embodiments, comprise from 1 to 4 or from 1 to 3 steel girders 218. The at least one steel girder 218 is conventionally disposed horizontally within the bottom base 102. Where more than one girder 218 is disposed horizontally within the bottom base, the girders should be disposed in parallel separated by a pre-determined distance. The disposition of the at least one steel girder 218 within the bottom base 102 is configured to provide additional structural support. Further, the at least one steel girder 218 may function as a connection interface for vertical structural elements of the shear panel 100.

The or each girder 218 should typically have a length ($l^g$, span) which is from about 50 to about 90% of the length ($l^b$) of the bottom base. For example, the at least girder 218 may have a length ($l^g$) which is from about 60 to about 90%, from about 70 to about 90% or from about 80 to about 90% of the length ($l^b$) of the bottom base. The maximum width ($w^g$) of the or each girder 218 should typically be from about 5 to about 30 cm, such as from about 5 to about 25 cm. The depth ($d^g$) of the or each girder 218 should typically be from about 10 to about 40%, such as from about 15 to about 30% of the length ($l^8$, span) of the girder 218.

In an embodiment, the at least one steel girder 218 has either a rectangular or an I-beam cross-section. As is known in the art, I-beam girders possess a top flange, a web, and a bottom flange. The width of the top and bottom flange may be the same or different: where the widths are different, the maximum width of the girder 218 is defined as the width of the broadest flange.

There is no particular intention to limit the cross-sectional form of the bottom base 102: T-shaped or L-shaped cross-sectional configurations may be employed in certain circumstances, depending upon specific construction requirements. However, it is conventional in the present disclosure for the bottom base 102 to have a rectangular cross-section area defined by: a vertical height, '$h^b$'; a length, "$l^b$"; and, a width, '$w^b$'. The dimensional characteristics of the bottom base 102 provide for efficient load distribution within the shear panel 100. Typically herein: the vertical height ($h^b$) of the bottom base 102 is from about 10 to about 50 cm, for example from about 10 to about 40 cm or from about 10 to about 30 cm; the length, $l^b$ is from about 50 to about 500 cm, for example from about 50 to 400 cm or from about 50 to about 300 cm; and, the width, $w^b$ is from about 25 to about 150 cm, for example from about 25 to about 125 cm or from about 25 to about 100 cm.

The shear panel 100 further comprises a frame 106 having a rectangular cross-section. The frame 106 functions as the primary vertical load transfer component between the upper structure and the bottom base 102. The frame 106 is configured to provide lateral stiffness to the shear panel 100 and to create a confined environment for the ferroconcrete filling within the vertical chambers. The frame 106 acts as permanent formwork during concrete placement and provides confinement to enhance the ductility and strength of the concrete core.

Figure 5:
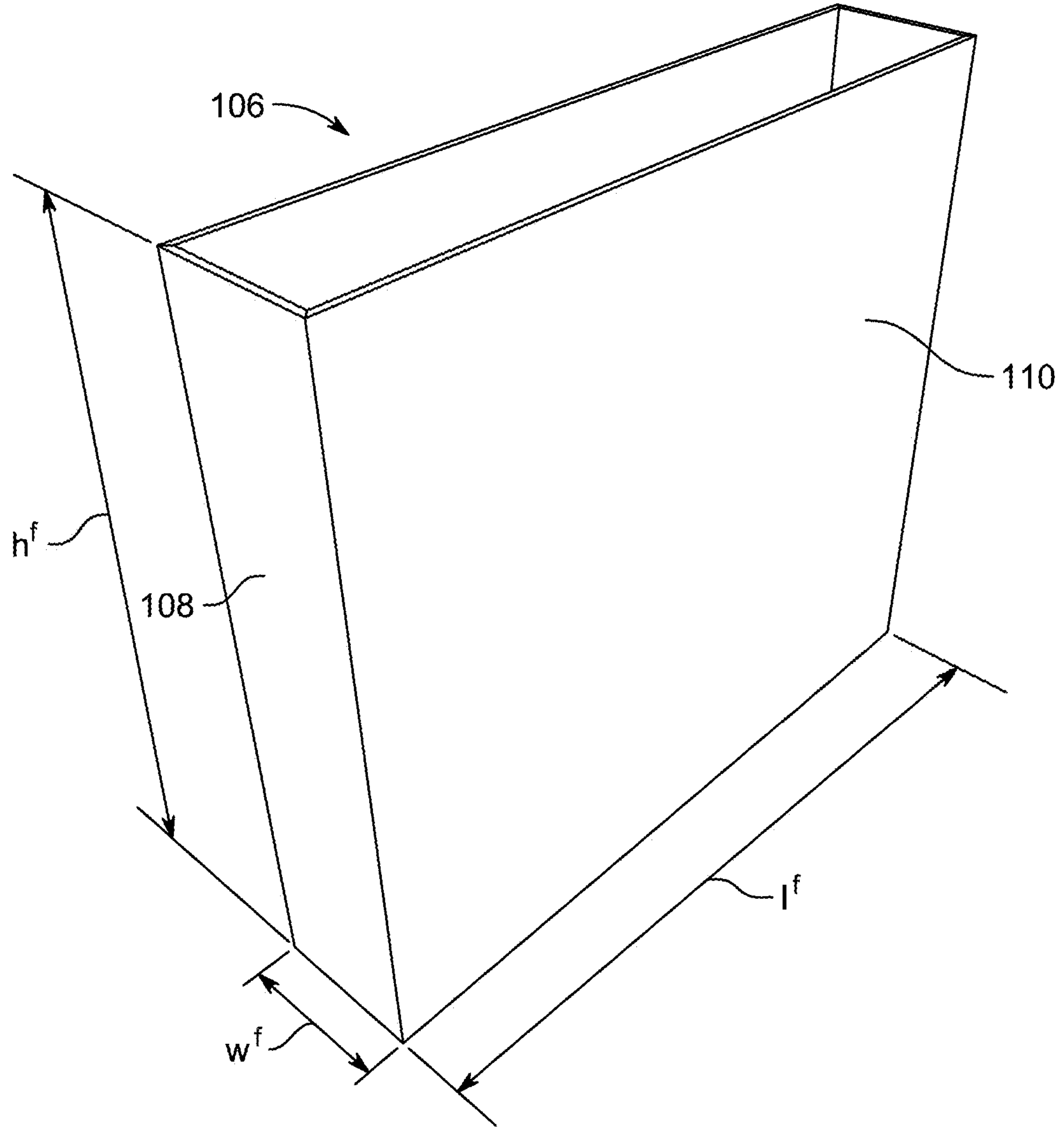
FIG. 5 is an isometric view of a steel frame for use in the shear panel, according to certain embodiments.

As depicted in FIG. 5, the frame 106 comprises a first pair of parallel steel walls 108 having: a length which defines the length ($l^f$) of the frame 106; and, a height which defines the height ($h^f$) of the frame 106. At least a fraction ($xh^f$) of the first pair of parallel steel walls will be embedded within the bottom base 102 such that the first pair of parallel steel walls extends a vertical distance ($h^e$) from that bottom base 102 ($h^e=h^f-xh^f$). The length ($l^f$) of the first pair of parallel steel walls 108 should be less than length ($l^b$) of the bottom base 102. In certain embodiments, the length ($l^f$) of the first pair of parallel steel walls 108 should be from about 70 to about 95%, such as from 75 to about 95% or from about 80 to 95% of the length ($l^b$) of the bottom base 102. The bottom base 102 should extend a substantially equal amount from both the distal and proximal ends of the first pair of parallel walls 108. As such, the reduced length ($l^f$) of the frame 106 relative to the length ($l^b$) of the bottom base 102 may create a stepped configuration that provides increased stability against overturning and improved load transfer characteristics at the bottom base 102 connection. The extension of the bottom base 102 beyond the frame 106 on both sides provides a wider footprint for load distribution.

The frame 106 further includes a second pair of parallel steel walls 110 having a length which defines the width ($w^f$) of the frame, as depicted in FIGS. 1A and 1B. The second pair of parallel steel walls 110 are placed orthogonally to the first pair of parallel steel walls 108. The orthogonal placement of the second pair of parallel steel walls 110 relative to the first pair of parallel steel walls 108 creates a closed enclosed structure configured to provide resistance to lateral loads applied to the shear panel 100. The orthogonal configuration of the steel walls furthermore creates a box-like structure that provides torsional rigidity and prevents lateral-torsional buckling of the shear panel 100 under combined loading conditions. The enclosed configuration also provides confinement to the ferroconcrete core, enhancing the compressive strength and ductility of the filled chambers.

At least a fraction of the second pair of parallel steel walls 110 will be embedded within the bottom base 102: that fraction should be determined such that the second pair of parallel steel walls 110 extends a substantially equivalent vertical distance ($h^e$) from that bottom base 102 as the first set of parallel steel walls 108.

Herein, the width ($w^f$) of frame 106—as defined by the length the second pair of parallel walls 110—is less than the width ($w^b$) of the bottom base 102. In certain embodiments, the width ($w^f$) of the frame—as defined by the length of the second pair of parallel steel walls 110—should be from about 70 to about 95%, such as from 75 to about 95% or from about 80 to 95% of the width ($w^b$) of the bottom base 102. The bottom base 102 should extend a substantially equal amount from both the distal and proximal ends of the second pair of parallel walls 110. This helps to maintain the aforementioned stepped configuration in that width direction. In toto, the stepped configuration in both width and depth directions provides a stable transition from the frame 106 to the bottom base 102, reducing stress concentrations at the interface and improving the overall structural performance of the shear panel 100.

As noted above, a fraction of the first pair of parallel steel walls 108 and of the second pair of parallel steel walls 110 is embedded in the first ferroconcrete 104 of the bottom base 102. Whilst the embedded fraction of each pair of walls may be independently determined, the vertical extension of each pair of walls from the bottom base should be substantially equivalent. The rectangular top of the frame 106 thereby presents a substantially horizontal plane. Further, the embedding of a portion of the first pair of the parallel steel walls 108 and the second pair of parallel steel walls 110 is configured to transfer the load from the frame 106 to the bottom base 102 of the shear panel 100. The embedded fraction prevents the frame 106 from horizontally sliding or vertically lifting under applied load conditions. In certain embodiments, the embedded length of each pair of steel walls should typically be from about 20 to about 100% or from about 20 to about 80 or from about 40% to about 80% of the height ($h^b$) of the bottom base 102.

It is not precluded that the embedded fractions a given steel wall may present a deformed surface which can enhance the surface area of contact between that fraction and the first ferroconcrete 104. For example, the embedded fraction of any given steel wall may be provided with at least one of ribs, lugs, shear studs or indentations.

Figure 2:
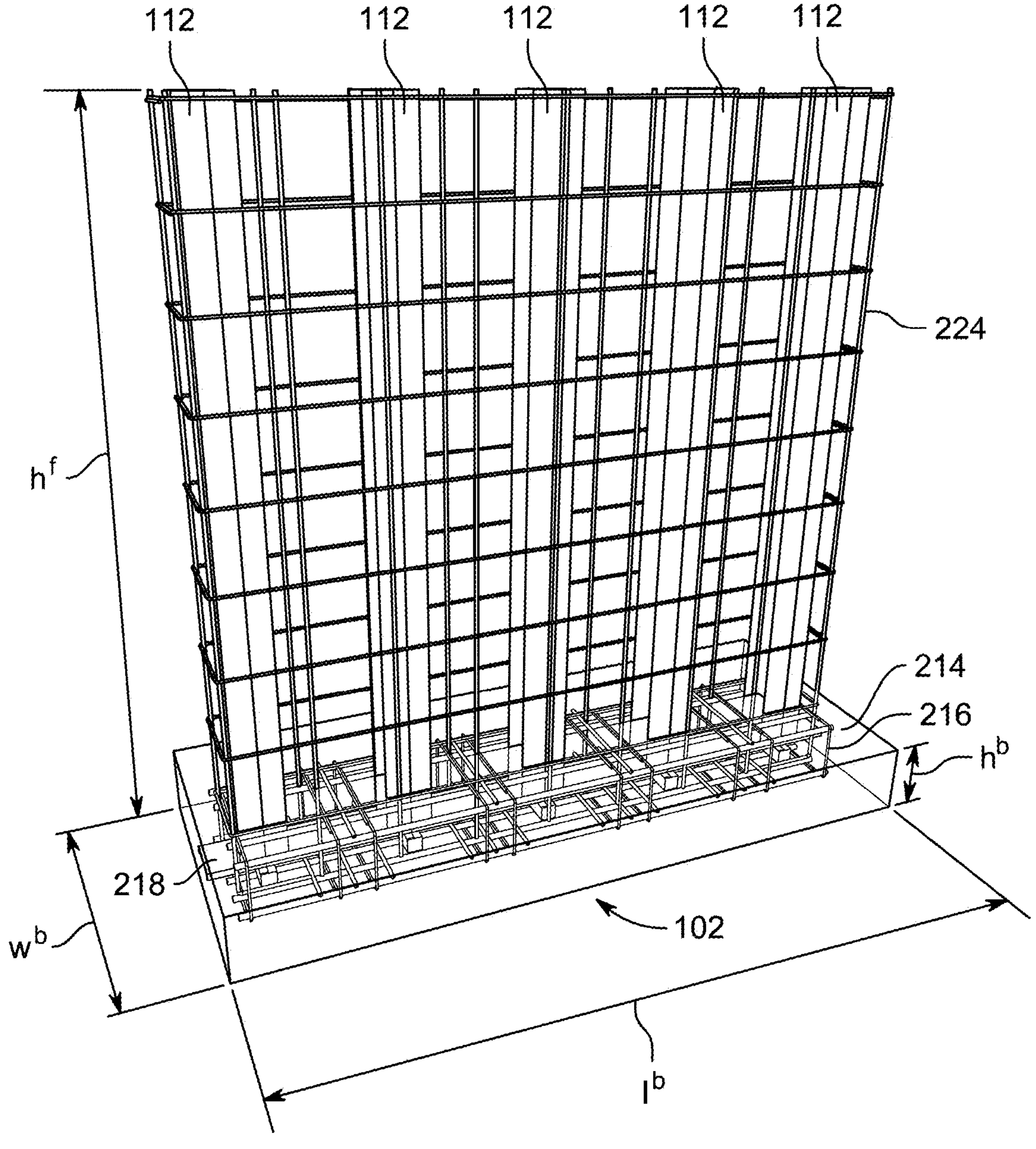
FIG. 2 is an isometric view of an internal reinforcement structure of the shear panel, according to certain embodiments.
Figure 3A:
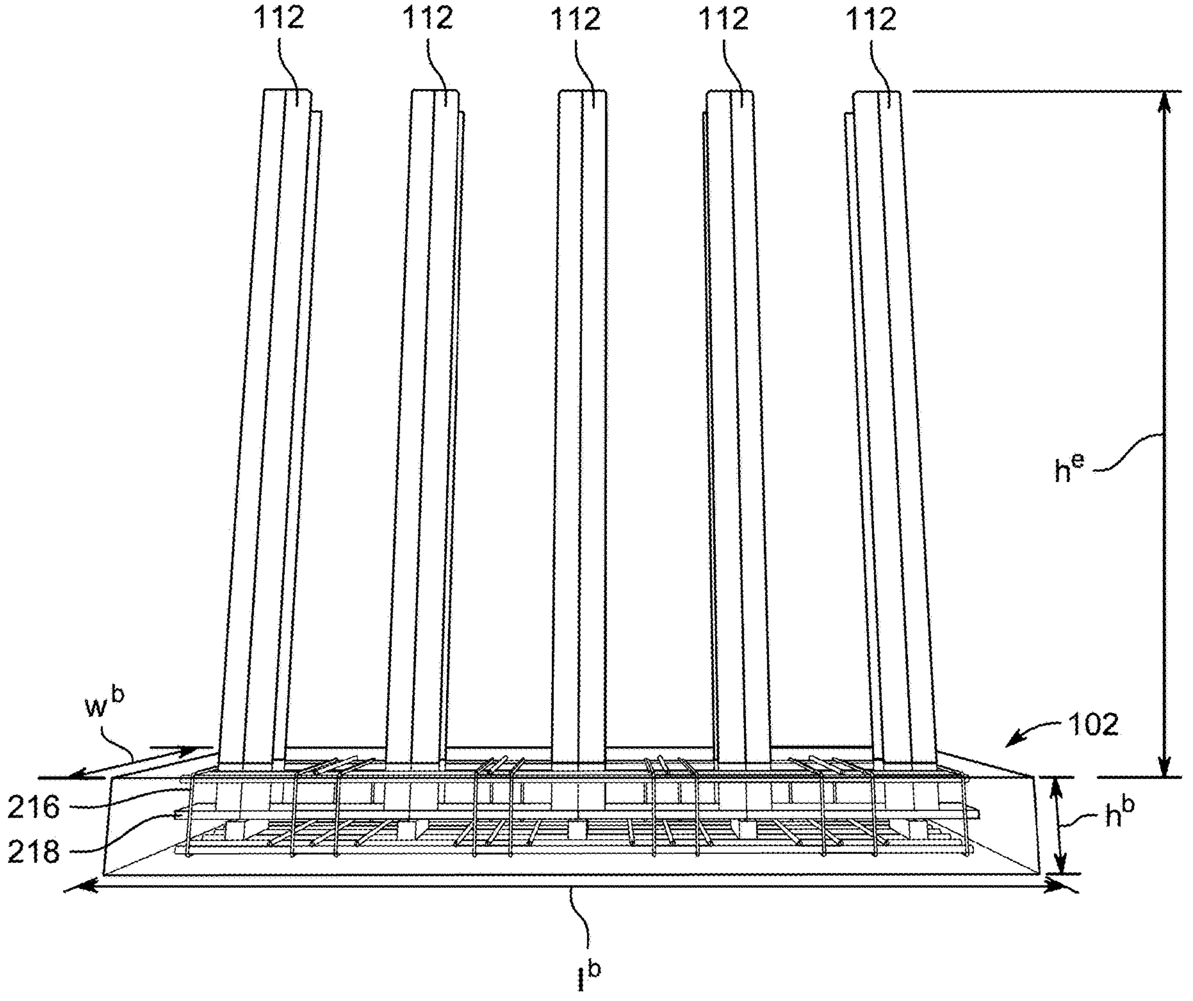
FIG. 3A is a front perspective view of a base and beam structure of the shear panel, according to certain embodiments.
Figure 3B:
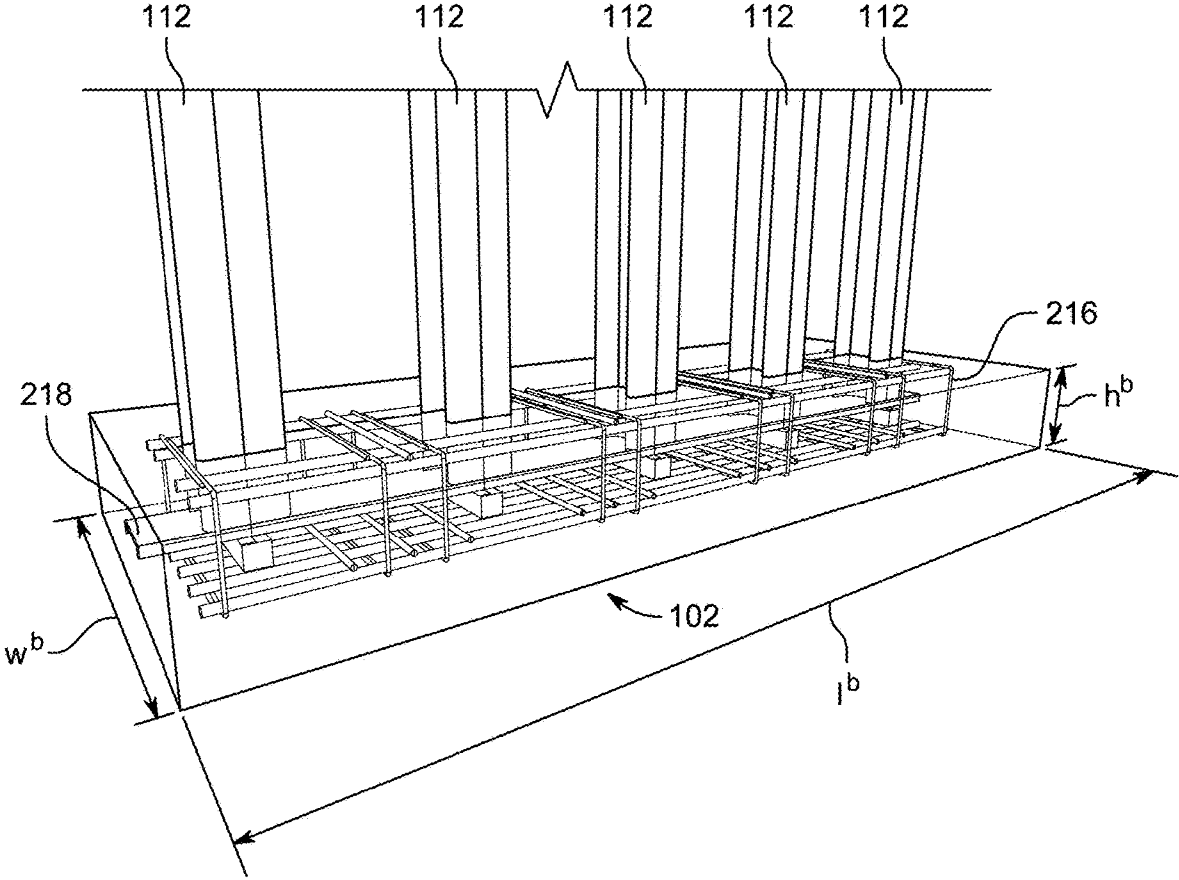
FIG. 3B is an partial isometric view of the base and beam structure of the shear panel, according to certain embodiments.
Figure 3C:
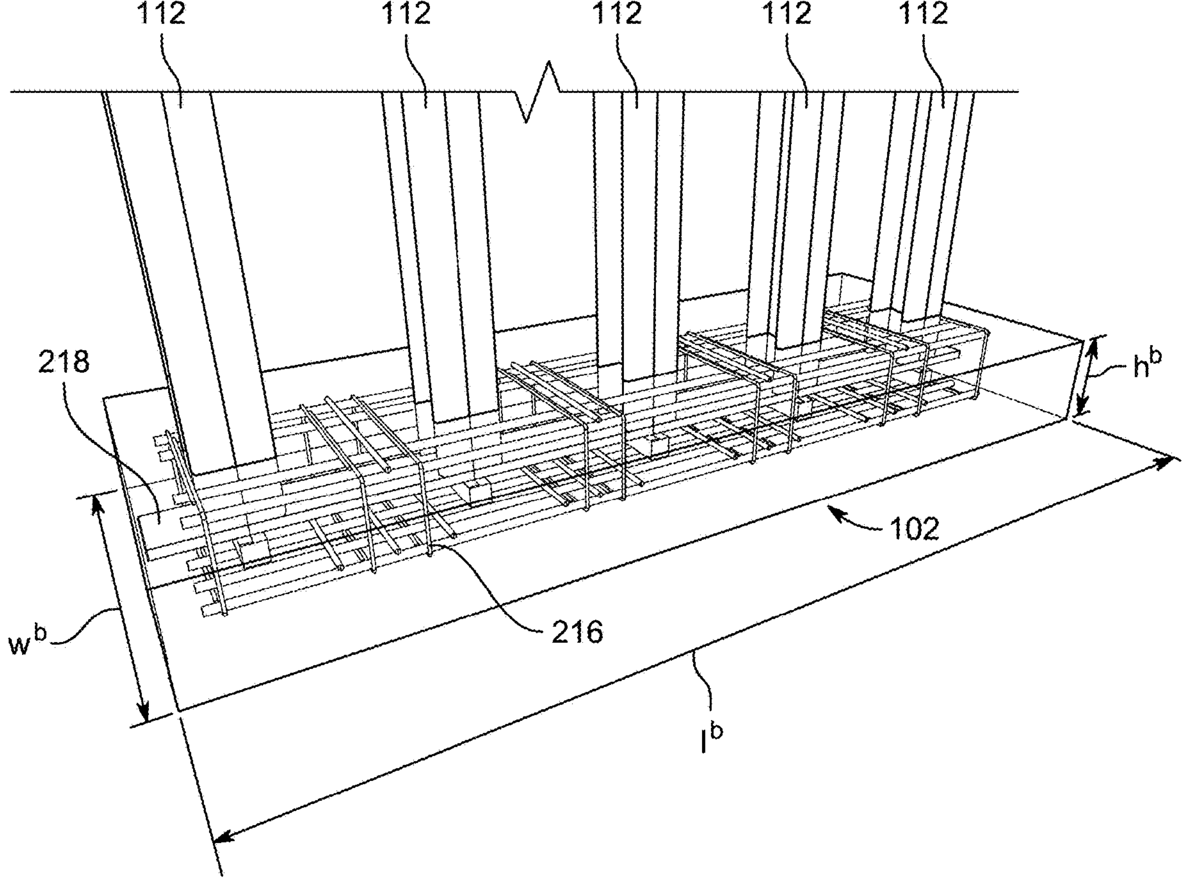
FIG. 3C is a further partial isometric view of the base and beam structure of the shear panel, according to certain embodiments.

As a result of the embedding, the first and second pairs of parallel steel walls, 108 and 110, each extend a vertical distance ($h^e$) from the bottom base 102, as shown in FIG. 2. Further, the first pair of parallel steel walls 108 and the second pair of parallel steel walls 110 are connected to each other and together with the bottom base 102 define the total internal volume of the steel frame '$V^f$'.

In an embodiment, the first pair of the parallel steel walls 108 and the second pair of the parallel steel walls 110 are structurally connected to each other through welded connections. The welded connection provides high strength and stiffness to the frame 106. The weld size and type which is suitable may be determined based on the thickness of the steel walls and the projected applied loads. In exemplary embodiments, the welded connections may be continuous fillet welds or groove welds designed to develop the full strength of the connected plates. That aside, any applied welding procedures should conform to the requirements of the American Welding Society AWS D1.1 *Structural Welding Code*, the disclosure of which is incorporated herein by reference in its entirety.

In an alternative embodiment, the pair of the parallel steel walls may have a bolted connection within the bottom base 102 to create a mechanical interlock. The bolted connection may include steel bolts and connecting plates to securely connect the first pair of parallel steel walls 108 with the second pair of parallel steel walls 110. The bolted connection may, in certain circumstances, be located within the bottom base 102. The bolted connections utilize high-strength bolts conforming to ASTM F3125 *Standard Specification for High Strength Structural Bolts and Assemblies, Steel and Alloy Steel, Heat Treated, Inch Dimensions* 120 *ksi,* 144 *ksi, and* 150 *ksi Minimum Tensile Strength, and Metric Dimensions* 830 *MPa and* 1040 *MPa Minimum Tensile Strength*, the disclosure of which is incorporated herein by reference in its entirety. Bolt diameter and spacing may be determined based on design loads and connection requirements.

In present examples, the frame 106 is constructed using a structural steel grade, such as A36 steel plate. In an example embodiment, the steel of the first and second pairs of parallel walls has: an ultimate tensile strength of at least 400 MPa, as determined by ASTM A36; a yield strength of at least 250 MPa, as determined by ASTM A36; and an elongation at break of at least 20%, as determined by ASTM A36, the disclosure of which is incorporated herein by reference in its entirety. In particular, the steel of the first and second pairs of parallel walls. In exemplary embodiments, the steel of each of the first and second pairs of parallel walls has: an ultimate tensile strength of from about 400 to about 700 MPa, from about 400 to about 650 MPa or from about 400 to about 625 MPa; a yield strength of from about 250 to about 500 MPa, for example of from about 275 to about 500 MPa or from about 300 to about 500 MPa; and, an elongation at break of at least about 20%, for example at least about 25% or at least about 30%. In certain embodiments, the chemical composition of the steel of the frame 106 may have, based on the weight of total weight of the steel: a carbon content of at most about 0.25 wt. %, for example at most 0.20 wt. %; a manganese content of at most about 0.50 wt. %, for example at most about 0.40 wt. %; a silicon content at most about 0.40 wt. %, for example at most about 0.30 wt. %; a phosphorus content of at most about 0.05 wt. % percent, for example at most about 0.03 wt. %; and, a sulfur content of at most 0.05 wt. %, for example at most about 0.03 wt. %. This composition provides weldability and ductility for the frame 106.

The shear panel 100 further comprises n steel beams 112 disposed vertically within the internal volume '$V^f$' of the frame 106, as shown in FIGS. 1A, 1B, 2, and 3A-3C. The n steel beams 112 are disposed at intervals across the length ($l^f$) of the frame 106. In some embodiments, the n steel beams 112 are positioned at equidistant intervals across the length ($l^f$) of the frame 106 for uniform load distribution. The number n is an integer of at least 2. In some embodiments, n is an integer of from 2 to 6. In other embodiments, n is an integer of from 3 to 5. The n steel beams 112 each contact the bottom base 102 and extend therefrom so as to divide the total internal volume of the frame into (n+1) vertical chambers, each having a height ($h^e$). Where the n steel beams 112 are disposed at equidistant intervals, the (n+1) vertical chambers would have substantially equal volumes.

The n steel beams 112 may have various cross-sectional configurations. In some embodiments, the n steel beams 112 have a rectangular cross-section. In other embodiments, the n steel beams 112 are H-beams. In exemplary embodiments where the n steel beams 112 are H-beams, each flange of the H-beam may contact one wall of the first pair of parallel steel walls 108. This contact can provide structural rigidity to the frame 106 and divides the total internal volume of the frame '$V^f$' into (n+1) discrete vertical chambers.

In certain embodiments, at least one of the n steel beams 112 is devoid of through-holes which would otherwise provide for fluidic communication between oppositely disposed sides of the beam. The absence of such through-holes may maintain the structural integrity of said at least one of the n steel beams 112. It is not precluded that each of the n steel beams 112 is devoid of through-holes.

In one or more embodiments, a fraction of each of the n steel beams 112 is embedded within the first ferroconcrete 104 of the bottom base 102. This arrangement anchors the n steel beams 112 to the bottom base 102 and facilitates efficient load transfer between the steel beams 112 and the concrete elements. The embedded fraction provides moment resistance at the bottom base 102 and prevents sliding or displacement of the n steel beams 112 under lateral loading. In some embodiments, the embedded fraction of each of the n steel beams 112 is connected to at least one steel girder 218 disposed within the bottom base 102. In a specific embodiment, the embedded fraction of each of the n steel beams 112 is welded to the at least one steel girder 218. This welded connection creates a direct and continuous load path from the n steel beams 112 through the at least one steel girder 218 and into the bottom base 102.

Each of the aforementioned (n+1) vertical chambers is filled with a second ferroconcrete 220 as depicted in FIGS. 1A and 1B. In those embodiments wherein the (n+1) chambers are discrete, said chambers may be independently filled with the second ferroconcrete 220 such that each chamber may comprise a ferroconcrete of the same or different composition. The second ferroconcrete 220 provides compressive strength and works in composite action with the frame 106 and the n steel beams 112 to resist applied loads. The second ferroconcrete 220, confined by the frame 106 and the n steel beams 112, exhibits enhanced strength and ductility.

Herein, the second ferroconcrete 220 comprises: a second concrete 222 as depicted in FIG. 2; and, at least one second steel reinforcing bar 224. In particular, the second ferroconcrete 220 should desirably comprise a plurality of second steel reinforcing bars 224 disposed vertically within the second concrete 222. The vertical reinforcement of the plurality of second steel reinforcing bars 224 ensures that the concrete-filled chambers effectively resist tensile stresses and maintain structural integrity.

Figure 4:
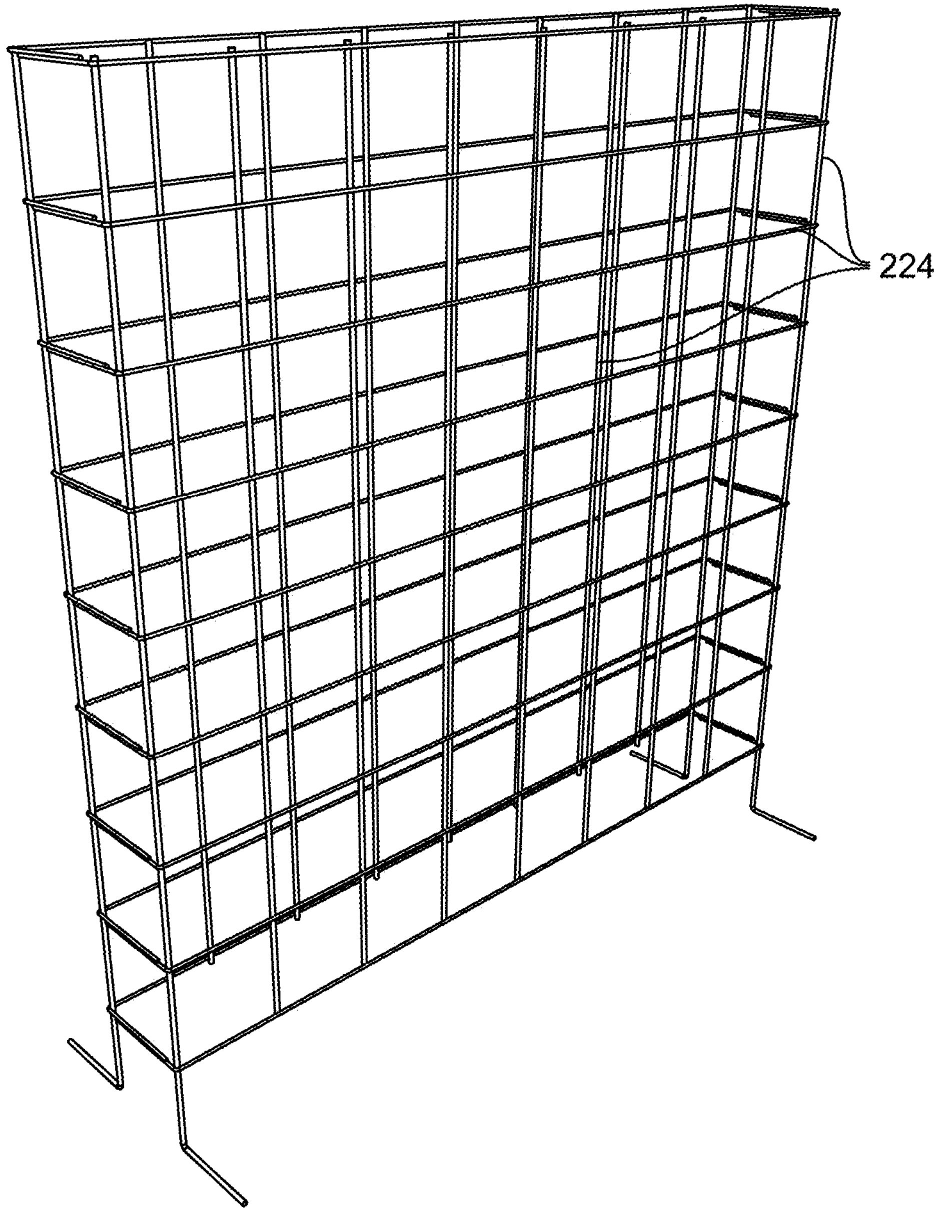
FIG. 4 is an isometric view of a reinforcement mesh for use in the shear panel, according to certain embodiments.

In an interesting embodiment, the plurality of second steel reinforcing bars 224 may be arranged as a reinforcement mesh, as illustrated in FIG. 4, which is disposed inside total internal volume of the frame ($V^f$) prior to casting the second concrete 222. The mesh may comprise: a first plurality of vertically disposed reinforcing bars; and, a second plurality of reinforcing bars disposed at an angle of from 10° to 90°, for instance from 30° to 90° or from 60 to 90° to said first plurality of reinforcing bars. A substantially orthogonal (90°) disposition of the first and second plurality of reinforcing bars is envisaged in particular. To form the aforementioned mesh, but without intention to limit the present disclosure, the first and second plurality of reinforcing bars may be welded, mechanically fastened or otherwise adhered together.

In an exemplary embodiment, the second concrete 222 comprises a hydraulic binder, aggregate and optionally adjuvants in a predefined ratio to achieve performance characteristics. The second concrete 222 provides the primary load-bearing medium while the at least one second steel reinforcement bar 224 mitigates tensile stress and prevents crack propagation under various loading conditions. The composition of the second concrete 222 is optimized to achieve the required strength while maintaining adequate workability for placement and consolidation around the steel reinforcing bars and other embedded elements.

It is preferred that the second concrete 222 comprises, based on the total weight of non-volatile constituents in the composition, from about 20 to about 60 wt. %, preferably from about 35 to about 60 wt. % of said hydraulic binder. Exemplary hydraulic binders, which may be used alone or in combination include, but are not limited to: cement(s); mineral additions; anhydrous calcium sulphate; and, semi-hydrated calcium sulphate. It is preferable herein that the hydraulic binder of the second concrete 222 comprises at least one cement. More preferably, the hydraulic binder comprises at least one cement selected from the group consisting of: Portland cement; natural cement; air-entraining Portland cement; Portland-pozzolan cement; slag cement; calcium aluminate cement; blast-furnace cement; and, mixtures thereof. In an embodiment, the hydraulic binder comprises at least one cement selected from the group consisting of: Portland cement; air-entraining Portland cement; Portland-pozzolan cement; and, mixtures thereof.

In certain embodiments, the second concrete 222 may contain gravel aggregates which should desirably be selected to provide adequate strength and durability while maintaining compatibility with the hydraulic binder. The second concrete 222 may desirably comprise, based on the total weight of non-volatile constituents in the composition from about 0 to about 40 wt. % of said gravel aggregates. For example, the second concrete 222 may comprise from about 10 about 35 wt. %, from about 15 to about 35 wt. % or from about 20 to about 35 wt. % of said gravel aggregates, based on the total weight of non-volatile constituents in the composition.

The maximum gravel aggregate size may be limited to ensure proper placement and consolidation of the second concrete 222 around the reinforcing bars disposed therein and within the confinement of the bottom base 102. It is preferred that the gravel aggregates present in the first concrete have at least one of: a specific gravity of from about 2 to about 3; a water absorption capacity of from about 1 to about 5 wt. %, such as from about 1 to about 3 wt. %, or from about 1 to about 2 wt. %; an aggregate crushing value of from about 20 to about 40%, such as from about 25 to about 35%; and, a fineness modulus of from about 2 to about 7, such as from about 2 to about 6, from about 3 to about 6 or from about 3 to about 5. These properties of the gravel aggregates are not mutually exclusive and any one or more thereof may be met by the aggregates employed.

The second concrete 222 may comprise, based on the total weight of non-volatile constituents in the composition from about 0 to about 40 wt. % of sand. For example, the second concrete 222 may comprise from about 10 about 35 wt. %, from about 15 to about 35 wt. % or from about 20 to about 35 wt. % of sand, based on the total weight of non-volatile constituents in the composition. It is preferred that any sand included in the composition has a fineness modulus of from about 2 to about 4.0 such as from about 2 to about 3.5. Further, sand used in the second concrete 222 should desirably be substantially free from clay, silt, and organic matter that may compromise the strength and durability of the concrete.

In certain embodiments, the second concrete 222 comprises at least one adjuvant. Such adjuvants can be used in such combination and proportions as desired, provided they do not adversely affect the nature and essential properties of the composition. While exceptions may exist in some cases, the second concrete 222 should not comprise in toto more than 20 wt. %, based on the total weight of non-volatile constituents in the composition, of adjuvants and preferably should not comprise more than 10 wt. % of said adjuvants.

The second concrete 222 may, in certain embodiments, comprise at least one adjuvant chosen from: colloidal silica; non-colloidal silica; colloidal dispersions of alumina and/or titania; plasticizers; superplasticizers, including but not limited to polycarboxylates, melamine sulfonates and polynaphthalene sulfonates; setting retarders, such as gluconates, carboxylic acids (such as citric acid or tartaric acid), boric acid, sodium tetraborate decahydrate (Borax) and alkali metal phosphates; catalysts; setting accelerators, such as nitrate, thiocyanate and chloride salts; curing accelerators, such as alkali metal carbonates; air entrainers, such as sodium lauryl sulfates; anti-shrinkage agents; anti-bubbling or antifoam agents; leak-proofing agents such as calcium stearate; natural pozzolanic compounds, such as pumice, trass, santorin earth, kieselguhr, homstone and chert; synthetic pozzolanic compounds, such as fired, ground clay (ground brick), fly ashes, silica dust, oil shale ash and metakaolin; anti-sedimentation agents, such as bentonites and attapulgites; mineral or organic pigments; a latex or latices; rheology modifiers; and, water retainers, such as starch ethers, cellulose ethers and modified cellulose ethers.

The second concrete 222 may comprise non-colloidal silica particles, preferably non-colloidal silica particles having a particle size of less than about 1 μm, for example from about 0.05 to 0.5 microns. When present, such sub-micron silica particles may preferably constitute from 1 to 15 wt. %, for example from 1 to 10 wt. % of the total weight of non-volatile constituents in the composition. Where sub-micron, non-colloidal silica is so-incorporated, the silica may be amorphous, crystalline or fumed. It is however preferred that said sub-micron silica should comprise or consist of fumed silica and more preferably fumed silica having a surface area of from about 30 to about 400 $m^2/g$, as determined by the Brunauer, Emmet and Teller (BET) method.

The inclusion of organic homo-polymers and co-polymers in the second concrete 222 is not precluded: a latex or latices of such polymers can moderate the adhesive and physical properties of the concrete. Non-limiting examples of suitable (co-)polymers include: vinyl acetate homopolymers; copolymers of vinyl acetate with at least one further vinyl ester; copolymers of vinyl acetate with ethylene; copolymers of vinyl acetate, ethylene and at least one further vinyl ester; copolymers of vinyl acetate, ethylene and at least one (meth)acrylic ester; copolymers of vinyl acetate with (meth)acrylates and other vinyl esters; copolymers of vinyl acetate, ethylene and vinyl chloride; copolymers of vinyl acetate, ethylene and styrene; copolymers of vinyl acetate with acrylates; styrene-acrylic ester copolymers; styrene-1,3-butadiene copolymers; and, vinyl chloride-ethylene copolymers.

Preference is given to: vinyl acetate homopolymers; copolymers of vinyl acetate with ethylene; copolymers of vinyl acetate, ethylene and styrene; copolymers of vinyl acetate, ethylene and at least one co-monomer selected from the group consisting of vinyl esters having from 1 to 15 carbon atoms in the carboxylic acid radical, such as vinyl propionate, vinyl laurate and vinyl versatate; copolymers of vinyl acetate, ethylene and at least one co-monomer selected from (meth) acrylic esters of unbranched or branched alcohols having from 1 to 15 carbon atoms, such as N-butyl acrylate and 2-ethylhexyl acrylate; copolymers of vinyl acetate, vinyl esters having from 1 to 15 carbon atoms in the carboxylic acid radical and (meth)acrylic esters of unbranched or branched alcohols having from 1 to 15 carbon atoms; and, copolymers of vinyl acetate, ethylene and vinyl chloride.

Such polymers may be prepared by conventional means accessible to the skilled artisan, such as by emulsion polymerization. In the alternative, such polymers may be provided from commercial sources. By way of example, reference may be made to: FX7000 styrene acrylate copolymer, available from Elotex; HD 1500 vinyl acetate/vinyl versatate copolymer, available from Elotex; and, and FX2322 vinyl acetate/ethylene copolymer available from Elotex.

As exemplary rheology modifiers having utility in the second concrete 222 of the present disclosure, mention may be made of modified or unmodified polysaccharides such as diutan gums, xanthan gums, gellan gums and welan gums.

The composition of the first concrete 214 and the second concrete 222 may be the same or different. Independently of this compositional choice, it is preferred that the second concrete 222 has a compressive strength of at least 30 MPa, as determined by ASTM C39. In certain embodiments, the second concrete 222 has a compressive strength of from about 30 to about 90 MPa, for example from about 30 to about 80 MPa, from about 30 to about 70 MPa or from about 30 to about 60 MPa.

Further, in certain embodiments, the at least one second steel reinforcing bar 224 may have an ultimate tensile strength of at least about 400 MPa, as determined by ASTM A36; a yield strength of at least about 250 MPa, as determined by ASTM A36; and, an elongation at break of at least about 5%, as determined by ASTM A36.

The or each second steel reinforcing bar 224 should typically have a substantially circular cross-section. In certain embodiments, the or each second steel reinforcing bar 224 should have a substantially circular cross-section characterized by a diameter of from about 5 to about 60 mm, such as from about 5 to about 55 mm, from about 5 to about 50 mm or from about 5 to about 45 mm. An exemplary second steel reinforcing bar 224 of circular cross-section may have a diameter of from about 10 to about 40 mm or from about 12 to about 36 mm.

Each second steel reinforcing bar 224 may independently have a smooth surface or a deformed surface. A preference may be noted for the use of at least one second steel reinforcing bar 224 having a deformed surface comprising at least one of ribs, lugs or indentations. In certain configurations, the at least one second steel reinforcing bar 224 has a ribbed surface which serves to moderate the surface area of contact between the bar 224 and the second concrete 222 to thereby improve a mechanical bond with the second concrete 222. The ribbed surface of the at least one second steel reinforcing bar 224 provides a mechanical interlock with the second concrete 222, which prevents slippage of the at least one second steel reinforcing bar 224 within the second concrete 222 and improves the structural strength of the second ferroconcrete 220.

In certain embodiments, the at least one second steel reinforcing bar 224 has: an ultimate tensile strength of at least about 400 MPa, as determined by ASTM A36; a yield strength of at least about 250 MPa, as determined by ASTM A36; and, an elongation at break of at least about 5%, as determined by ASTM A36. In exemplary embodiments, the at least one second steel reinforcing bar 224 has: an ultimate tensile strength of from about 400 to about 700 MPa, from about 400 to about 650 MPa or from about 400 to about 625 MPa; a yield strength of from about 250 to about 500 MPa, for example of from about 275 to about 500 MPa or from about 300 to about 500 MPa; and, an elongation at break of at least about 10%, for example at least about 15% or at least about 20%.

In operation, the shear panel 100 involves the coordinated interaction of the bottom base 102, the frame 106, the n steel beams 112, the first ferroconcrete 104, and the second ferroconcrete 220 to create a structural support configured to resist lateral forces and transfer loads to a building foundation. The first ferroconcrete 104 of the bottom base 102 operates under compression and shear loading conditions to dissipate energy. The second ferroconcrete 220 within the vertical chambers provides additional compressive strength and structural continuity. The combination of the steel frame 106, the n steel beams 112, and the first and second ferroconcretes 104, 220 creates a composite structure with enhanced stiffness, strength, and energy dissipation capacity, making the shear panel 100 suitable for use in high-rise buildings located in areas with high wind or seismic activity.

For purposes of the present disclosure, the shear panel 100 may be configured in different arrangements depending on the specific structural performance characteristics required. In one embodiment, corresponding to a multi-column reinforced concrete steel box shear wall, the n steel beams 112 have a rectangular cross-section. This configuration divides the internal volume '$V^f$' of the frame 106 into a series of rectangular vertical chambers. In an alternative embodiment, corresponding to a profiled reinforced concrete steel box shear wall, the n steel beams 112 are H-beams. The use of H-beams as the n steel beams 112 provides a certain structural efficiency and strength-to-weight ratio for the shear panel 100. The selection of the cross-section for the n steel beams 112 depends on the load-resisting requirements of the structure, including the anticipated magnitude of seismic forces.

The configuration of the shear panel 100 provides multiple advantages in the construction of large and high-rise buildings. The shear panel 100 is a modular system that provides lateral stiffness, load-bearing capacity, and ductility. The design of the shear panel 100 allows the shear panel 100 to be prefabricated, which can reduce construction schedules considerably. The use of prefabricated shear panels 100 can also eliminate the need for on-site scaffolding during the erection of the structural system. This structural system is an alternative to conventional reinforced concrete walls in the wind or seismic design of buildings. The shear panel 100 can be employed in the construction of mid- to high-rise buildings, providing a system for resisting lateral forces from wind and seismic events.

Numerous modifications and variations of the present disclosure are possible in light of the above teachings. It is therefore to be understood that within the scope of the appended claims, the invention may be practiced otherwise than as specifically described herein.

The invention claimed is:

1. A shear panel for use in the modular construction of buildings, the shear panel comprising:

a bottom base disposed horizontally and comprising a first ferroconcrete, the bottom base having a rectangular cross-section and having a height ($h^b$), length ($l^b$) and width ($w^b$); and, a frame having a rectangular cross-section and comprising:

a first pair of parallel steel walls which have an length which defines the length ($l^f$) of the frame, the length ($l^f$) of the frame being 70 to 95% of the length ($l^b$) of the bottom base; and, a second pair of parallel steel walls which are orthogonal to the first pair of parallel walls and which have a length which defines the width ($w^f$) of the frame, the width ($w^f$) of the frame being less than 70 to 95% of the width ($w^b$) of the bottom base, wherein:

a fraction of the height ($h^f$) of the first and second pairs of parallel steel walls is embedded within the first ferroconcrete of the bottom base such that the first and second pairs of parallel steel walls each extend a vertical distance ($h^e$) from the bottom base; and, the first and second parallel walls are connected to each other and together with the bottom base define the total internal volume of the frame ($V^f$), n steel beams which are disposed vertically within the internal volume of the frame and at intervals across the length ($l^f$) thereof, which steel beams each contact the bottom base and extend therefrom so as to divide the total internal volume of the frame ($V^f$) into (n+1) vertical chambers each having an height ($h^e$), wherein:

n is an integer of at least 2; and each of the (n+1) vertical chambers is filled with a second ferroconcrete, wherein the n steel beams are H-beams, wherein the n steel beams each further contact the first pair of parallel walls so as to divide the total internal volume of the frame ($V^f$) into (n+1) discrete vertical chambers each having a height ($h^e$) and wherein each of the (n+1) discrete vertical chambers is independently filled with the second ferroconcrete, wherein the n steel beams are H-beams of which each flange contacts one wall of the first pair of parallel steel walls, wherein a fraction of each of the n steel beams is embedded within the first ferroconcrete of the bottom base, wherein the first ferroconcrete comprises a first concrete and at least one first steel reinforcing bar disposed therein, the at least one first steel reinforcing bar having:

an ultimate tensile strength of at least about 400 MPa, as determined by ASTM A36, a yield strength of at least about 250 MPa, as determined by ASTM A36, and an elongation at break of at least about 5%, as determined by ASTM A36, wherein the first concrete has a compressive strength of at least about 30 MPa, as determined by ASTM C39, wherein the second ferroconcrete comprises a second concrete and at least one second steel reinforcing bar, the at least one second steel reinforcing bar having:

an ultimate tensile strength of at least about 400 MPa, as determined by ASTM A36, a yield strength of at least about 250 MPa, as determined by ASTM A36, and an elongation at break of at least about 5%, as determined by ASTM A36, wherein the second concrete has a compressive strength of at least about 30 MPa, as determined by ASTM C39, and wherein the steel of the first and second pairs of parallel walls have:

an ultimate tensile strength of from about 400 to about 800 MPa, as determined by ASTM A36, a yield strength of from about 250 to about 750 MPa, as determined by ASTM A36, and an elongation at break of at least about 5%, as determined by ASTM A36.

2. The shear panel according to claim 1, wherein n is an integer of from 2 to 6.

3. The shear panel according to claim 1, wherein n is an integer of from 3 to 5.

4. The shear panel according to claim 1, wherein at least one of the n steel beams is devoid of through-holes.

5. The shear panel according to claim 1 comprising a plurality of first steel reinforcing bars disposed horizontally within the bottom base.

6. The shear panel according to claim 1, wherein the first ferroconcrete further comprises at least one steel girder which has a rectangular cross-section and is disposed horizontally within the bottom base.

7. The shear panel according to claim 6, wherein:

a fraction of each of the n steel beams is embedded within the first ferroconcrete of the bottom base; and the embedded fraction of each of the n steel beams is connected to the at least one steel girder.

8. The shear panel according to claim 7, wherein the embedded fraction of each of the n steel beams is welded to the at least one steel girder.

9. The shear panel according to claim 1 comprising a plurality of second steel reinforcing bars disposed vertically within the second concrete.

10. The shear panel according to claim 1, wherein the length ($l^f$) is 75 to 95% of the length ($l^b$).

11. The shear panel according to claim 10, wherein the length ($l^f$) is 80 to 95% of the length ($l^b$).

12. The shear panel according to claim 1, wherein the width ($w^f$) is 75 to 95% of the width ($w^b$).

13. The shear panel according to claim 12, wherein the width ($w^f$) is 80 to 95% of the width ($w^b$).

14. The shear panel according to claim 1, wherein the n steel beams are positioned at equidistant intervals across the length ($l^f$).

* * * * *